United States Patent [19]
Jensen

[11] Patent Number: 5,331,118
[45] Date of Patent: Jul. 19, 1994

[54] PACKAGE DIMENSIONAL VOLUME AND WEIGHT DETERMINATION SYSTEM FOR CONVEYORS

[76] Inventor: Soren Jensen, 4 Puritan Rd., Duxbury, Mass. 02332

[21] Appl. No.: 982,448

[22] Filed: Nov. 27, 1992

[51] Int. Cl.$^5$ .................... G01G 19/40; G01B 11/00
[52] U.S. Cl. ................... 177/25.14; 177/245; 364/562; 364/564; 33/1 V; 33/121
[58] Field of Search ................ 177/25.15, 245, 25.14; 364/562, 564; 33/1 V

[56] References Cited

U.S. PATENT DOCUMENTS

| | | | |
|---|---|---|---|
| 3,372,486 | 3/1968 | Chow | 33/1 V |
| 4,773,029 | 9/1988 | Claesson et al. | 364/564 X |
| 4,905,512 | 3/1990 | Hayashi | 364/564 X |
| 5,105,392 | 4/1992 | Stringer et al. | 364/564 X |
| 5,220,536 | 6/1993 | Stringer et al. | 364/565 X |

*Primary Examiner*—George H. Miller, Jr.
*Attorney, Agent, or Firm*—William Nitkin

[57] ABSTRACT

A method and system for determining the dimensional volume of a package by moving the package on a conveyor belt system over a horizontally disposed strip containing machine-readable indicia indicating units of incremental length along said strip starting from a zero point and by a vertically disposed strip containing machine-readable indicia indicating units of incremental length along said strip starting from a zero point, with a horizontally disposed reader above the horizontally disposed strip to read the uncovered indicia on the horizontally disposed strip and a vertically disposed reader able to read the uncovered indicia on the vertically disposed strip with a computer to determine the lowest uncovered incremental length measurement of the indicia on tile horizontally disposed strip, such measurement being tile width of tile package and the lowest uncovered incremental length measurement of tile indicia on tile vertically disposed strip, such measurement being tile height of tile package, and a device to measure tile package's length as it moves on the conveyor belt system such that the computer calculates tile package's dimensional volume by taking tile product of tile measurements for the length, tile height and tile width of the package. A weigh-in-motion scale is utilized on the conveyor belt system, the output of which is also directed to the computer to calculate tile package's dimensional weight.

18 Claims, 2 Drawing Sheets

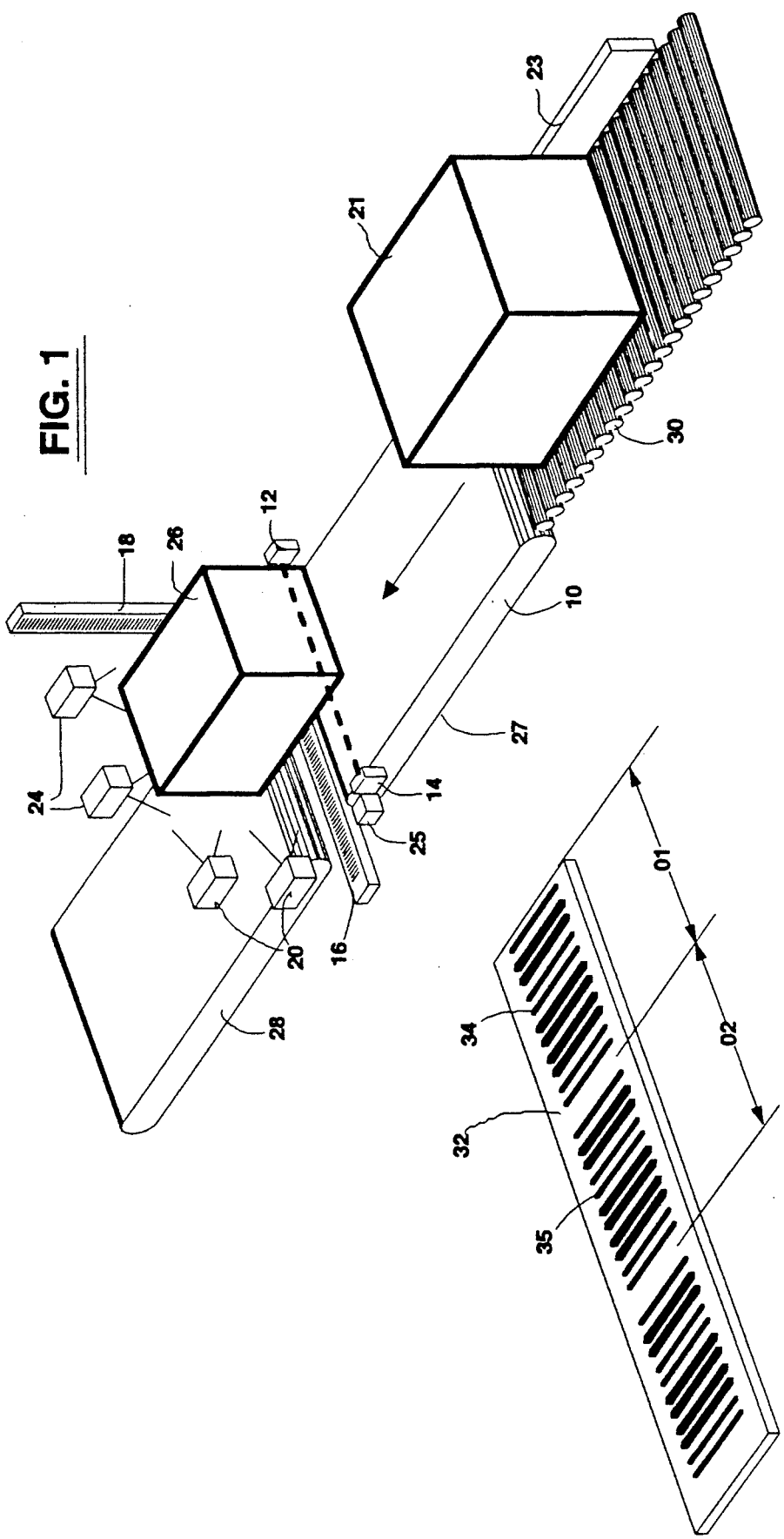

PACKAGE DIMENSIONAL VOLUME AND WEIGHT DETERMINATION SYSTEM FOR CONVEYORS

BACKGROUND OF THE INVENTION

1. Field of the Invention

The device and system of this invention reside in the field of systems for the determination of both weight and size dimensions of objects on conveyor belt systems and more particularly relate to an apparatus and method for dimensional volume and weight determination of packages utilizing indicia such as bar codes on measuring strips.

2. Description of tile Prior Art

In the freight forwarding business, domestic and international shippers will often base delivery rates not only on the weight of a package but also on its dimensional volume which taken together are sometimes referred to as "dimensional weight." The determination of dimensional weight to calculate shipping cost has become necessary as the cost of transportation has gone up. Not only is the weight of a package a factor in cost but also the space or volume that that package occupies. Consideration of dimensional volume is especially critical in air cargo shipping where cargo space is especially limited and where weight determination alone would be an inadequate basis for calculating the value of the space taken up by a package. Dimensional volume consideration is also important in surface transportation such as truck or train service where cubicle space is limited.

Conveyor systems have been developed in the prior art which weigh packages moving along the conveyor. Also these conveyor systems can determine a package's dimensional volume for later calculation of "dimensional weight." In many cases the dimensional weight is compared to the actual cargo weight and the larger of these two amounts is used to determine shipping charges. The system which has customarily been used for high-speed dimensional volume determination passes the package along a conveyor system through a dimensioning frame where a first array of infrared lights shines down vertically and a second array of infrared lights shines across horizontally. The infrared lights are detected by sensors disposed on the opposite sides of tile frame. The infrared light beams not blocked by the package are sensed by the sensors which then indicate the dimensional characteristics of the package as it passes through tile frame. These height, length and width measurements are then directed to a computer which calculates tile dimensional volume of the package by adding each package "slice" as blocked by each beam together. The conveyor also utilizes a weigh-in-motion conveyor belt to determine individual package weight. Such infrared device systems are very costly and consequently have not been widely adopted in tile freight industry.

It is also well known in tile art to use bar codes on packages and pass such bar codes by a bar code reader or scanner to get information about tile package such as its contents, destination, etc.

Static and weigh-in-motion scales have been used on conveyors and have been integrated with such infrared scanner systems to automate the process of capturing weight along with package dimensional volume data. Based on such data, delivery rates are calculated and shipping manifests generated.

SUMMARY OF THE DISCLOSURE

It is an object of this invention to provide a far less costly system than that of the prior art for determining dimensional volume of packages on conveyor lines for the determination of shipping costs therefor and shipping space requirements. The system of this invention utilizes well-known existing components, namely conveyors with bar code scanning systems thereon which scanning systems are economical and widely used in the freight industry.

It is a further object of this invention to provide a system which automatically captures the dimensional data of packages in motion on a conveyor by utilizing a combination of bar code and standard weight determination technologies.

It is a still further object of this invention to provide an integrated measuring system on a conveyor belt system capable of electronically acquiring information about a package's dimensions and to transmit such information to electronic data processing units for calculation of the package's dimensional volume for use in other calculations such as determination of its freight cost and/or ability to be packed within certain cargo spaces.

It is yet another object of this invention to provide an electronic record of the measured dimensional volume of a package, the actual package weight from a weigh-in-motion scale, other information acquired such as from bar code labels affixed to the package, and any other additional information from electronic data bases. Such combined information can then be used to perform mechanical sorting of a plurality of packages on a conveyor system according to their weight, dimensional volume, or other derived information.

The invention disclosed herein includes a package dimensional volume measuring apparatus and system which determines tile length, width and height of a package or any rectangular or square-sided product as it is in motion on a conveyor belt. The system of this invention utilizes a combination of an in-feed conveyor belt metered by a pulse generator incremental length encoder in combination with a photoelectric eye which scans across the belt to detect the presence or absence of a package. The pulse generator generates a pulse for a selected incremental length of movement of the belt. When the package first breaks the photoelectric eye beam, the system starts counting the number of pulses until the package passes by the beam and the beam is re-established. The number of pulses multiplied by the selected incremental length of belt movement that occurred per pulse yields the package's length. Also included in tile system are a vertical bar code reader array and a horizontal bar code reader array to continuously read two bar-coded measuring strips, one of which is positioned on the horizontal plane beneath the carrying surface of the conveyor belt, and perpendicular to the direction of movement of the conveyor belt and can be mounted in the gap between two conveyor belts. The other bar-coded measuring strip is positioned in a vertical plane to one side of the conveyor belt and can be aligned adjacent to the horizontally positioned bar-coded measuring strip. Each of the measuring strips has indicia such as bar codes imprinted thereon which, when sensed, identify increments of length starting at a zero reference point. Those bar codes that are not covered by the package passing thereover and thereagainst identify the width and height of the package by the counting of such exposed bar codes. Prior to entering onto an infeed conveyor, the package is first skewed by the conveyor system to the zero reference point side above the horizontal measuring bar code strip and adjacent to the vertical bar code strip. In one embodiment of a measuring strip tile bar code segments can each be an ascending number, indicating an incremental length so that the smallest bar code number scanned on the horizontal bar code strip and the smallest bar code number scanned on the vertical bar code strip then indicate, respectively, the width and the height of the package. The package's length, width and height measurements can be downloaded to a computer to mathematically calculate dimensional volume of the package from the product of all three measurements. This result can be displayed on a CRT, a terminal or transmitted to another computer system. The collection of the dimensional volume data can be used to calculate shipping charges based on weight and/or dimensional volume, for load planning or for any other purpose that one might want to collect the dimensional data of the package. The horizontal and vertical bar code reader arrays positioned opposite the bar code strips can also be used to scan any bar code(s) placed in a readable position on the package and determine whatever identifying data about the package is on such bar code(s) and also enter that information into the computer system.

BRIEF DESCRIPTION OF THE DRAWINGS

FIG. 1 illustrates a perspective view of a conveyor belt utilizing the system of this invention.

FIG. 2 illustrates a perspective view of a section of a measuring strip having bar codes indicating ascending increments of length thereon.

DESCRIPTION OF THE PREFERRED EMBODIMENT(S)

Figure 3:
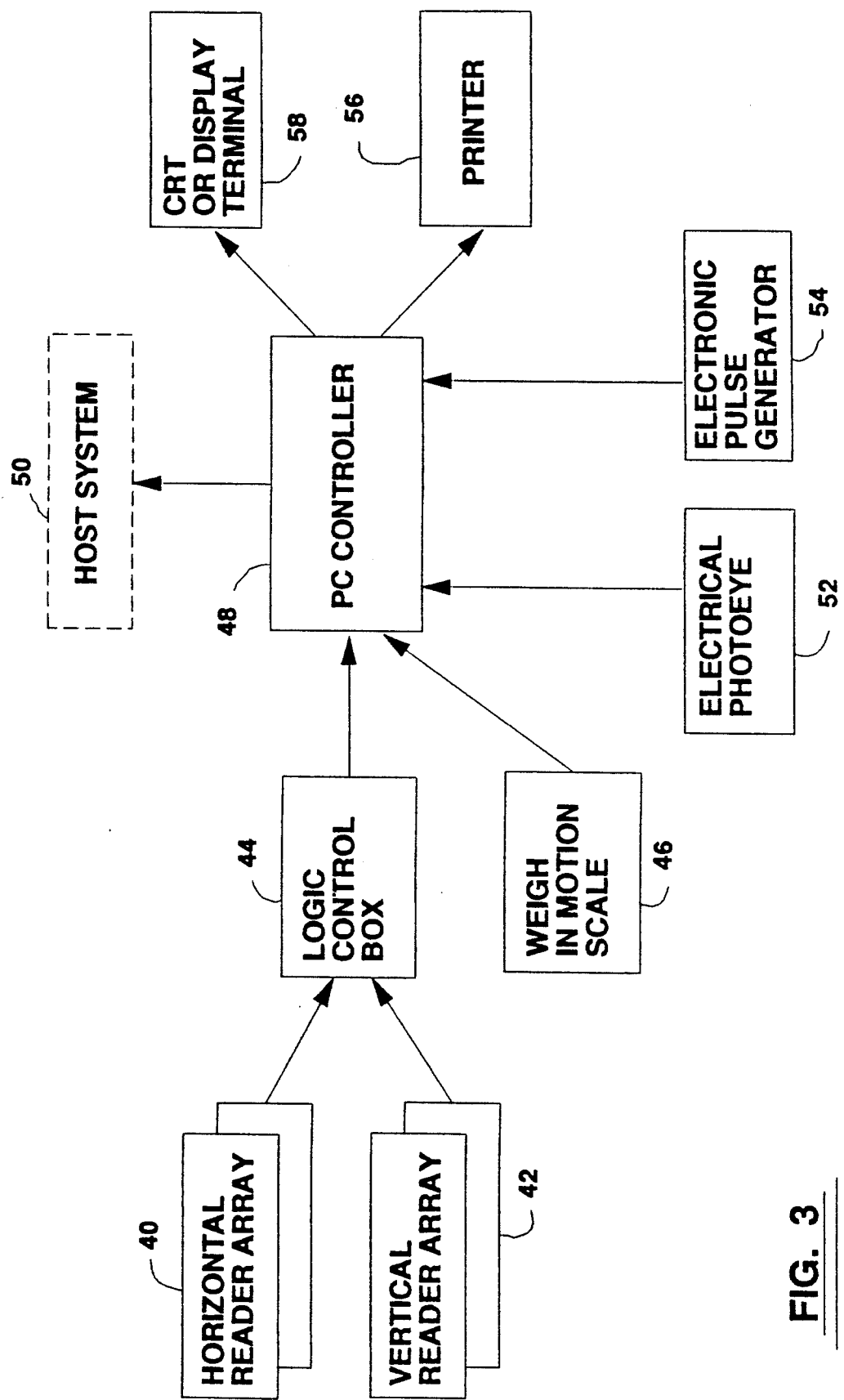
FIG. 3 illustrates a flow diagram of the information network and computer system of this invention

FIG. 1 is a perspective view showing the elements of the basic system of this invention. The direction of package flow is indicated by the arrow on infeed conveyor 10. Packages such as package 21 enter onto infeed conveyor 10 from skewed conveyor 30. Skewed conveyor 30 is a type of conveyor well known in the art which spaces packages apart from one another and also automatically skews the packages to one side of the conveyor and aligns them parallel to the direction of flow. The most commonly used type of skewed conveyor is a powerdriven live roller conveyor with skewed rollers which force the packages to one side, causing the packages to ride against fixed vertical guard 23. Instead of vertical guard 23, a powered vertical belt unit can alternately be utilized. Each package, once it is aligned on the right side of the conveyor system, as illustrated, continues onto the powered-belt infeed conveyor 10. The belt of the infeed conveyor operates at a faster speed than the speed of conveyor 30 in order to assure that a sufficient gap is provided between successive packages prior to each package's leading and trailing edges passing through the photoelectric beam detecting system as described further below. Infeed conveyor 10 is provided with an electric pulse generator 25, also known as a shaft encoder, which is mounted on the drive shaft which pulse generator/encoder is also well known in the prior art. Pulse generator/encoder 25 accurately synchronizes with the speed of infeed conveyor 10 in order to synchronize the movement of the infeed conveyor belt 10 with tile pulses which are used as inputs to count small definable increments of belt movement such as, for example, $\frac{1}{8}$ inch of length of infeed conveyor belt movement per pulse. Infeed conveyor 10 is also combined with a weigh-in-motion conveyor scale 27, the use of which is well known in the prior art and which scale determines the weight of a package on infeed conveyor 10 since only one package is on infeed conveyor belt 10 at a time. This weight information is sent to a computer as will be described further below. At the end of infeed conveyor belt 10 is photoelectric-eye-beam producer 12 directing a detectable beam across to a photoelectric-eye-beam detector 14. Detector 14 first detects the leading edge of a package when tile leading edge interrupts such photoelectric eye beam and transmits this data to an electronic data processing unit. At the same time, pulse signals are transmitted from pulse generator 25 to an electronic data processing unit as seen in FIG. 3. The electronic data processing unit counts the pulse signals from the time when the leading edge of the package breaks the beam until the time the package advances beyond the beam. The trailing edge of the package is detected when the photoelectric-eye-beam detector 14 senses the beam again and this input is transmitted to the electronic data processing unit. Simultaneously, the pulse signal counts from the pulse generator stops, and the electronic data processing unit then calculates the length of tile package based upon tile defined incremental length of belt travel for each pulse signal multiplied by tile number of pulse signals received during the passage of the package. This method of determining package length is well known within the materials handling industry. From infeed conveyor 10 tile package is transferred to takeaway conveyor 28. Between conveyor 28 and infeed conveyor 10, which operate at exactly the same speed, there is a small gap in which area the height and width indicia-encoded measuring strips of this invention can be located. A horizontally disposed coded measuring strip 16 is mounted between and somewhat below tile carrying surface of infeed conveyor 10 and take-away conveyor 28. On tile side to which the package has been skewed, in the case illustrated as tile right side, a vertically disposed indicia-coded measuring strip 18 is mounted. Measuring strips 16 and 18 function as machine-readable rulers and in one embodiment with fixed readable bar codes attached and placed along the length of the strip starting from the zero reference point with incremental measurements. The bar code labels can each indicate fixed increments of length above tile zero reference point, for example $\frac{1}{2}$ inch, 1 inch, 1$\frac{1}{2}$ inches, etc. The bar code symbology used can be a two-digit interleaved two of five or other established and accepted bar code symbologies or equivalent. Any remote readable indicia coding, such as radio frequency tags or character numbers which can be used with an optical character recognition system, can also be utilized. It is important that. the width of each bar code be as short as possible but that the dimension of the smallest bar or space be sufficiently large to allow for remote scanning by a bar code reader. horizontal measuring strip 16 has its zero reference point aligned exactly to the edge of the bottom package side which was first skewed toward the zero reference point of strip 16. Vertical measuring strip 18, not fully seen in FIG. 1 since part of strip 18 is behind package 26, is positioned to the right of the package. Similarly, horizontal measuring strip 16 has its zero reference point aligned to the bottom edge of the package's right side, also partially not seen in FIG. 1 as it is under the package. Each of measuring strips 16 and 18 has readable portions that extend beyond the bottom of the package and above the top of the package, respectively. A series of fixed-position moving beam laser scanners, which can be ACCU Sort Model 55, Model 30 or equivalent, are disposed in a first array above strip 16, forming a horizontal reader array 24. Another series of scanners are disposed in a second array, forming vertical reader array 20. The scanners in each array can be daisy-chained to one another and interconnected to the same decoding logic control box 44, seen in FIG. 3, which can be an ACCU Sort Model 2000 or equivalent. The scanners can also be self-contained scanner units including decode software such as computer Identics Scan Star 80 and 85 or Scan Star 15SR or equivalent and connected to each other in a slave-to-master configuration. Immediately after the leading edge of a package breaks the beam of the photoelectric-eye-beam producer 12 and moves by and over the vertical and horizontal reader arrays 20 and 24, the package covers a portion of horizontal measuring strip 16 and a portion of vertical measuring strip 18. Because the segments of such strips under and beside the package are covered, they cannot be read by the horizontal and vertical reader arrays 20 and 24, respectively, as the package passes. However, each reader array 20 and 24 can identify which indicia, such as bar codes on each strip 16 and 18, are not covered and will transmit these readings to a receiving unit such as decoder logic control box 44, seen in FIG. 3, or directly to an electronic data processing unit as will be discussed below. The receiving unit determines the lowest indicia or bar code number transmitted as the package width read by the horizontal reader array 24 and the lowest indicia or bar code number transmitted as the height read by the vertical reader array 20. When the trailing edge of the package exits the photoelectric eye's beam, the receiving unit will stop accepting measuring data from the horizontal and vertical reader arrays. Based upon the information received, the width and height of the package are identified and the length determined by the number of pulses received from the electric pulse generator 25 during the breaking of the photoelectric beam. The processing unit in controller 48, shown in FIG. 3, can then utilize the length, width and height of the package to calculate the dimensional volume of the package. Horizontal and vertical laser scanners such as, for example, computer Identics Scan Star 80, 85 or Scan Star 15 SR or equivalent can also be used to capture information from those bar code labels, which are attached directly to packages, such as additional non-dimensional package information for the data base in the electronic data processing unit in controller 48. The calculated dimensional volume for a package is then electronically recorded and combined with the captured weight, other package information and other information already in the data base to generate a complete shipping manifest for that package. This manifest can be printed in hard copy and/or transmitted to a host computer system connected to the electronic data processor in controller 48.

FIG. 2 illustrates a portion of a bar code strip 32 showing first bar code 01 indicated by numeral 34 indicating a fixed unit of measurement which could be inches or any other unit of length. Adjacent to first bar code 34 is second bar code 02 indicated by numeral 35 which indicates a second similar fixed unit of length. Bar code measuring strips 16 and 18 have a series of such individual bar codes, each indicating a fixed unit of length which can be read by the reader arrays. The reader arrays, though, only observe those bar codes which are not covered by the package. By reading the lowest measurement number of the visible bar codes, the system can determine the width from horizontal reader array 24 scanning horizontal measuring strip 16 and the height from vertical reader array 20 scanning the uncovered bar code portions of the vertical measuring strip 18.

FIG. 3 illustrates the basic electronic information network and flow diagram of the system of this invention to demonstrate how the components interact and interface with controller 48 and how information is received and transmitted. In FIG. 3 photoelectric eye 52 transmits a signal every time its beam is blocked by the leading edge or unblocked by the trailing edge of a package. Electronic pulse generator 54 at the same time transmits pulse signals continuously to controller 48. Vertical reader array 42 transmits the numbers of the detected bar codes that it reads to decoder logic control box 44 which at the same time receives information from horizontal reader array 40 of the bar codes which it reads. Logic control box 44 then transmits the lowest measurement bar code number detected to determine the height and width of the package to computer controller 48. Controller 48 contains a computer which performs the calculation of the dimensional volume and dimensional weight of each package from the information and signals received from vertical reader array 42, horizontal reader array 40, photoelectric eye 52, electronic pulse generator 54 and weigh-in-motion scale 46. The data can be used to generate package manifest information by the computer in controller 48 and transmitted to a host computer system 50 or, with additional hardware, displayed on a CRT screen 58 or printed out on printer 56 for use by the shipper.

Although tile present invention has been described with reference to particular embodiments, it will be apparent to those skilled in the art that variations and modifications can be substituted therefor without departing from the principles and spirit of the invention.

I claim:

1. A method for determining the dimensional volume of a package having sides and length, width and height on a conveyor belt having first and second side edges, comprising the steps of:
   moving said package on said conveyor belt;
   skewing said package to tile first side of said conveyor belt to be aligned with a side parallel to the direction of movement of said conveyor belt;
   determining tile length of said package as it moves on said conveyor belt;
   providing a horizontally disposed strip below, and disposed perpendicular to the direction of, said conveyor belt and the level of said conveyor belt, said strip containing machine-readable indicia indicating units of incremental length along said strip starting from zero, said zero point disposed at said first side edge of said conveyor belt;
   providing a vertically disposed strip at said first side edge of said conveyor belt, said strip facing toward said second side edge, said strip containing machine-readable indicia indicating units of incremental length along said strip starting from zero, said zero point disposed at said first side edge of said conveyor belt;

providing a horizontally disposed reader above said horizontally disposed strip and above the height of said package, said reader able to read said indicia on said horizontally disposed strip;

providing a vertically disposed reader at said second side edge of said conveyor able to read said indicia on said vertically disposed strip;

moving said package to a position to cover portions of said vertically and horizontally disposed strips adjacent to said first side edge, said package covering said indicia starting at the zero point of said vertically and horizontally disposed strips;

reading by means of said vertically and horizontally disposed readers tile portions of indicia of said vertically and horizontally disposed strips not covered by said package;

determining the lowest incremental length measurement of said indicia on said horizontally disposed strip, such measurement being tile width of said package;

determining tile lowest incremental length measurement of said indicia on said vertically disposed strip, such measurement being the height of said package; and calculating the package's dimensional volume by taking the product of said measurements for the length, tile height and the width of said package.

2. The method of claim 1 further including the step of determining the weight of said package.

3. A method for determining the dimensional volume of a package having sides and a length, width and height, said package moving from a first conveyor belt to a second conveyor belt, said conveyor belts each having first and second side edges, comprising the steps of:

moving said package on said first conveyor belt;

skewing said package to the first side edge of said first conveyor belt to be aligned with a side parallel to the direction of movement of said first conveyor belt;

determining the length of said package as it moves on said first conveyor belt;

providing a horizontally disposed strip between and below, and disposed perpendicular to the direction of, said first and second conveyor belts and the level of said conveyor belts, said strip containing machine-readable indicia indicating units of incremental length along said strip starting from zero, said zero point disposed at said first side edge of said first and second conveyor belts;

providing a vertically disposed strip at said first side edge of said first and second conveyor belts disposed between said first and second conveyor belts, said strip facing toward said second side edge of said first and second conveyor belts, said strip containing machine-readable indicia indicating units of incremental length along said strip starting from zero, said zero point disposed at said first side edge of said first and second conveyor belts;

providing a horizontally disposed reader above said horizontally disposed strip and above the height of said package, said reader able to read said indicia on said horizontally disposed strip;

providing a vertically disposed reader at said second side edge of said first conveyor belt able to read said indicia on said vertically disposed strip;

moving said package from said first conveyor belt to said second conveyor belt to cover portions of said vertically and horizontally disposed strips adjacent to said first side edge of said first and second conveyor belts, said package covering said indicia starting at the zero points of said vertically and horizontally disposed strips;

reading by means of said vertically and horizontally disposed readers portions of indicia of said vertically and horizontally disposed strips not covered by said package;

determining the lowest incremental length measurement of said indicia on said horizontally disposed strip, such measurement being the width of said package;

determining the lowest incremental length measurement of said indicia on said vertically disposed strip, such measurement being the height of said package; and calculating the package's dimensional volume by taking the product of said measurements for the length, the height and the width of said package.

4. The method of claim 3 further including the step of determining the weight of said package.

5. A system for determining the dimensional volume of a package having sides and a length, width and height, comprising:

a first conveyor belt having a first side edge and a second side edge, said first conveyor belt having a direction of movement;

a second conveyor belt in proximity to said first conveyor belt;

means to skew said package to the first side edge of said first conveyor belt to be aligned with a side of said package parallel to the direction of movement of said first conveyor belt;

means to determine the length of said package as it moves on said first conveyor belt;

a horizontally disposed strip disposed below the level, and perpendicular to the direction of movement, of said first conveyor belt, and between said first and second conveyor belts, said horizontally disposed strip having machine-readable indicia indicating units of incremental length along said horizontally disposed strip starting from a zero point, said zero point disposed at said first side edge of said first conveyor belt;

a vertically disposed strip at said first side edge of said first conveyor belt between said first and second conveyor belts, said vertically disposed strip facing toward said second side edge of said first conveyor belt, said vertically disposed strip containing machine-readable indicia indicating units of incremental length along said vertically disposed strip starting from a zero point, said zero point disposed at said first side edge of said first conveyor belt;

a horizontally disposed reader positioned above said horizontally disposed strip and above the height of said package, said horizontally disposed reader able to read said indicia on said horizontally disposed strip;

a vertically disposed reader at said second side edge of said first conveyor belt between said first and second conveyor belts opposite said vertically disposed strip, said vertically disposed reader able to read said indicia on said vertically disposed strip;

said package, when moving from said first conveyor belt to said second conveyor belt, covering portions of said vertically and horizontally disposed strips adjacent to said first side edge of said first conveyor belt, said package covering said indicia starting at the zero points of said vertically and horizontally disposed strips, allowing said vertically and horizontally disposed readers to read the portions of indicia of said vertically and horizontally disposed strips not covered by said package; and computing means to determine tile lowest incremental length measurement of said indicia read by said reader on said horizontally disposed strip, such measurement being tile width of said package; to determine the lowest incremental length measurement of said indicia read by said reader on said vertically disposed strip, such measurement being the height of said package and to calculate the package's dimensional volume by taking the product of said measurements for tile length, the height and tile width of said package.

6. The system of claim 5 further including means to determine the weight of said package.

7. A method for determining the dimensional volume of a package having sides and length, width and height on a conveyor belt having first and second side edges, comprising the steps of:

moving said package on said conveyor belt;

skewing said package to the first side of said conveyor belt to be aligned with a side parallel to the direction of movement of said conveyor belt;

determining the length of said package as it moves on said conveyor belt;

providing a horizontally disposed bar code strip below, and disposed perpendicular to the direction of, said conveyor belt and the level of said conveyor belt, said strip containing machine-readable bar codes indicating fixed units of incremental length along said strip starting from zero, said zero point disposed at said first side edge of said conveyor belt;

providing a vertically disposed bar code strip at said first side edge of said conveyor belt, said strip facing toward said second side edge, said strip containing machine-readable bar codes indicating fixed units of incremental length along said strip starting from zero, said zero point disposed at said first side edge of said conveyor belt;

providing a horizontally disposed bar code reader above said horizontally disposed strip and above the height of said package, said reader able to read said bar codes on said horizontally disposed strip;

providing a vertically disposed bar code reader at said second side edge of said conveyor able to read said bar codes on said vertically disposed strip;

moving said package to a position to cover portions of said vertically and horizontally disposed strips adjacent to said first side edge, said package covering said bar codes starting at the zero point of said vertically and horizontally disposed strips;

reading by means of said vertically and horizontally disposed readers the portions of bar codes of said vertically and horizontally disposed strips not covered by said package;

determining the lowest incremental length measurement of said bar code on said horizontally disposed strip, such measurement being the width of said package;

determining the lowest incremental length measurement of said bar code on said vertically disposed strip, such measurement being the height of said package; and calculating the package's dimensional volume by taking the product of said measurements for the length, the height and the width of said package.

8. The method of claim 7 further including the step of determining the weight of said package.

9. The method of claim 8 wherein said package has at least one bar coded label thereon, said bar coded label containing data, said method further including the steps of:

reading by means of said horizontally and vertically disposed bar code readers said bar coded label on said package to obtain said data; and integrating such package label data with the weight and dimensional volume of said package.

10. The method of claim 7 further including the step of:

programming said vertically and horizontally disposed bar code readers to perform part of the steps of determining the width and height of said package.

11. A method for determining the dimensional volume of a package having sides and a length, width and height, said package moving from a first conveyor belt to a second conveyor belt, said conveyor belts each having first and second side edges, comprising the steps of:

moving said package on said first conveyor belt;

skewing said package to the first side edge of said first conveyor belt to be aligned with a side parallel to the direction of movement of said first conveyor belt;

determining the length of said package as it moves on said first conveyor belt;

providing a horizontally disposed bar code strip between and below, and disposed perpendicular to the direction of, said first and second conveyor belts and the level of said conveyor belts, said strip containing machine-readable bar code indicia indicating units of incremental length along said strip starting from zero, said zero point disposed at said first side edge of said first and second conveyor belts;

providing a vertically disposed bar code strip at said first side edge of said first and second conveyor belts disposed between said first and second conveyor belts, said strip facing toward said second side edge of said first and second conveyor belts, said strip containing machine-readable bar code indicia indicating units of incremental length along said strip starting from zero, said zero point disposed at said first side edge of said first and second conveyor belts;

providing a horizontally disposed bar code reader above said horizontally disposed strip and above the height of said package, said reader able to read said bar code indicia on said horizontally disposed strip;

providing a vertically disposed bar code reader at said second side edge of said first conveyor belt able to read said bar code indicia on said vertically disposed strip;

moving said package from said first conveyor belt to said second conveyor belt to cover portions of said vertically and horizontally disposed bar code strips adjacent to said first side edge of said first and second conveyor belts, said package covering said bar code indicia starting at the zero points of said vertically and horizontally disposed strips;

reading by means of said vertically and horizontally disposed readers portions of bar code indicia of said vertically and horizontally disposed strips not covered by said package;

determining the lowest incremental length measurement of said bar code indicia on said horizontally disposed strip, such measurement being the width of said package;

determining the lowest incremental length measurement of said bar code indicia on said vertically disposed strip, such measurement being the height of said package; and calculating the package's dimensional volume by taking the product of said measurements for the length, the height and the width of said package.

12. The method of claim 11 further including the step of determining the weight of said package.

13. The method of claim 12 wherein said package has at least one bar coded label thereon, said bar coded label containing data, said method further including the steps of:

reading by means of said horizontally and vertically disposed bar code readers said bar coded label on said package; and integrating by data processing said package bar coded label data with the weight and dimensional volume of said package.

14. The method of claim 13 further including the step of:

programming said readers to perform part of said data processing to determine the width and height of said package.

15. A system for determining the dimensional volume of a package having sides and a length, width and height, comprising:

a first conveyor belt having a first side edge and a second side edge, said first conveyor belt having a direction of movement;

a second conveyor belt in proximity to said first conveyor belt;

means to skew said package to said first side edge of said first conveyor belt to be aligned with a side of said package parallel to the direction of movement of said first conveyor belt;

means to determine the length of said package as it moves on said first conveyor belt;

a horizontally disposed bar code strip disposed below the level, and perpendicular to the direction of movement, of said first conveyor belt, and between said first and second conveyor belts, said horizontally disposed bar code strip having machine-readable bar code indicia indicating units of incremental length along said horizontally disposed bar code strip starting from a zero point, said zero point disposed at said first side edge of said first conveyor belt;

a vertically disposed bar code strip at said first side edge of said first conveyor belt between said first and second conveyor belts, said vertically disposed bar code strip facing toward said second side edge of said first conveyor belt, said vertically disposed bar code strip containing machine-readable bar code indicia indicating units of incremental length along said vertically disposed strip starting form a zero point, said zero point disposed at said first side edge of said first conveyor belt;

a horizontally disposed bar code reader positioned above said horizontally disposed bar code strip and above the height of said package, said horizontally disposed reader able to read said bar code indicia on said horizontally disposed bar code strip;

a vertically disposed bar code reader at said second side edge of said first conveyor belt between said first and second conveyor belts opposite said vertically disposed bar code strip, said vertically disposed bar code reader able to read said bar code indicia on said vertically disposed bar code strip;

said package, when moving from said first conveyor belt to said second conveyor belt, covering portions of said vertically and horizontally disposed bar code strips adjacent to said first side edge of said first conveyor belt, said package covering said bar code indicia starting at the zero points of said vertically and horizontally disposed bar code strips, allowing said vertically and horizontally disposed bar code readers to read the portions of bar code indicia of said vertically and horizontally disposed bar code strips not covered by said package; and computing means to determine the lowest incremental length measurement of said bar code indicia read by said reader on said horizontally disposed bar code strip, such measurement being the width of said package; to determine the lowest incremental length measurement of said bar code indicia read by said reader on said vertically disposed bar code strip, such measurement being the height of said package; and to calculate said package's dimensional volume by taking the product of said measurements for the length, the height and the width of said package.

16. The system of claim 15 further including means to determine the weight of said package.

17. The system of claim 16 wherein said package has at least one bar coded label thereon, said bar coded label containing data, said system further including:

means to read said bar coded label on said package by said horizontally and vertically disposed bar code readers; and means to integrate such package label data read by said readers with the weight and dimensional volume of said package.

18. The system of claim 15 wherein said computing means include said horizontally and vertically disposed readers to determine the width and height of said package.

* * * * *